United States Patent
Liu et al.

(10) Patent No.: US 12,186,831 B2
(45) Date of Patent: Jan. 7, 2025

(54) WELDING ASSEMBLY AND BATTERY MODULE

(71) Applicant: CONTEMPORARY AMPEREX TECHNOLOGY (HONG KONG) LIMITED, Hong Kong (CN)

(72) Inventors: Guofeng Liu, Ningde (CN); Anwei Wu, Ningde (CN); Xing Wang, Ningde (CN); Lei Wang, Ningde (CN); Bin Zhao, Ningde (CN); Linshan Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 764 days.

(21) Appl. No.: 17/388,342

(22) Filed: Jul. 29, 2021

(65) Prior Publication Data

US 2021/0354241 A1    Nov. 18, 2021

Related U.S. Application Data

(63) Continuation of application No. PCT/CN2019/075363, filed on Feb. 18, 2019.

(30) Foreign Application Priority Data

Jan. 30, 2019   (CN) .................. 201920164844.8

(51) Int. Cl.
*H01M 50/204* (2021.01)
*B23K 26/244* (2014.01)
(Continued)

(52) U.S. Cl.
CPC .......... *B23K 26/322* (2013.01); *B23K 26/244* (2015.10); *H01M 50/204* (2021.01); *B23K 2101/34* (2018.08)

(58) Field of Classification Search
CPC .................................................. H01M 50/204
See application file for complete search history.

(56) References Cited

U.S. PATENT DOCUMENTS

| | | | |
|---|---|---|---|
| 4,682,002 A | 7/1987 | Delle Piane et al. | |
| 2007/0172728 A1* | 7/2007 | Yamashita | H01M 50/3425 429/174 |
| 2015/0030912 A1* | 1/2015 | Nose | H01G 13/00 429/176 |

FOREIGN PATENT DOCUMENTS

| | | |
|---|---|---|
| CN | 1156075 A | 8/1997 |
| CN | 207800714 U | 8/2018 |

(Continued)

OTHER PUBLICATIONS

International Search Report dated Oct. 25, 2019 issued in PCT/CN2019/075364, 4 pages.

*Primary Examiner* — Olatunji A Godo
(74) *Attorney, Agent, or Firm* — Scully, Scott, Murphy & Presser, P.C.

(57) ABSTRACT

The present application provides a welding assembly and a battery module. The welding assembly includes: a first weldment; and a second weldment, welded and fixed with the first weldment to form a welding seam; where, at least one side of the welding seam is provided with an exhaust channel; and the exhaust channel is located between the first weldment and the second weldment. In the present application, an exhaust gas generated during welding can be discharged from the exhaust channel to prevent it from entering the welding seam to reduce the strength of the welding seam.

14 Claims, 9 Drawing Sheets

(51) Int. Cl.
  *B23K 26/322* (2014.01)
  *B23K 101/34* (2006.01)

(56) References Cited

FOREIGN PATENT DOCUMENTS

EP  0178394 A2  4/1986
EP  1440761 A1  7/2004

* cited by examiner

WELDING ASSEMBLY AND BATTERY MODULE

CROSS-REFERENCE TO RELATED APPLICATIONS

The present application is a continuation of International Application No. PCT/CN2019/075363, filed on Feb. 18, 2019, which claims priority to Chinese Patent Application No. 201920164844.8, filed to the Chinese Patent Office on Jan. 30, 2019 and entitled "WELDING ASSEMBLY AND BATTERY MODULE", and the entire content of which is incorporated herein by reference.

TECHNICAL FIELD

The present application relates to the technical field of batteries, and in particular, relates to a welding assembly and a battery module.

BACKGROUND

During welding process, workpieces to be joined need to be heated to partially melt the workpieces, so as to achieve joining between the workpieces, and the workpieces will form a welding seam at a joining position.

During welding process, exhaust gases (such as carbon dioxide and hydrogen, etc.) are formed between the workpieces. However, since the existing welding is generally performed at the overlapping position of the workpieces, the exhaust gases cannot be discharged in time, and will enter the welding seam, resulting in reducing the strength of the formed welding seam.

SUMMARY

In view of this, an embodiment of the present application provides a welding assembly and a battery module, which are beneficial to exhaust an exhaust gas generated during welding.

In a first aspect, a welding assembly is provided. The welding assembly includes:
a first weldment; and
a second weldment, is configured to weld and fix to the first weldment, forming a welding seam;
where, at least one side of the welding seam is provided with an exhaust channel; and
the exhaust channel is located between the first weldment and the second weldment.

Alternatively, the first weldment and/or the second weldment includes a base layer and a coating layer;
the coating layer is arranged on a surface of the base layer; and
a boiling point of the coating layer is lower than a melting point of the base layer.

Alternatively, the base layer includes one or more of iron and steel; and
the coating layer includes one or more of zinc and magnesium.

Alternatively, the first weldment and/or the second weldment is a galvanized plate.

Alternatively, a maximum spacing between the first weldment and the second weldment at a position of the exhaust channel is 0.05 mm-0.5 mm.

Alternatively, a maximum spacing between the first weldment and the second weldment at the position of the exhaust channel is 0.1 mm-0.3 mm.

Alternatively, one of the first weldment and the second weldment is provided with a convex portion; and
the convex portion is configured to be in contact with the other one of the first weldment and the second weldment, so that the first weldment and the second weldment are arranged at an interval to form the exhaust channel.

Alternatively, the first weldment is provided with the convex portion; and
the convex portion is configured to be in contact with the second weldment, so that the first weldment and the second weldment are arranged at an interval to form the exhaust channel.

Alternatively, the convex portion is configured to extend to both ends of the first weldment or the second weldment along a width direction.

Alternatively, one of the first weldment and the second weldment is provided with a plurality of convex portions, the plurality of convex portions are disposed at intervals along a width direction of the first weldment or the second weldment.

Alternatively, one of the first weldment and the second weldment is provided with a concave portion;
the concave portion is configured to penetrate and extend to both ends of the first weldment or the second weldment along a width direction; and
the concave portion and the other one of the first weldment and the second weldment are configured to enclose to form the exhaust channel.

Alternatively, the first weldment is provided with the concave portion;
the concave portion is configured to penetrate and extend to both ends of the first weldment along the width direction; and
the concave portion and the second weldment are configured to enclose to form the exhaust channel.

Alternatively, the first weldment includes a first portion and a second portion, and the first portion and the second portion are arranged in relatively bending;
a corner of the first weldment is arranged in contact with the second weldment; and
an acute angle is formed between the second portion and the second weldment to form the exhaust channel.

In a second aspect, a battery module is provided. The battery module includes:
a battery cell group; and
the above welding assembly;
two first weldments located at two ends of the battery cell group, respectively;
two second weldments located at both sides of the battery cell group, respectively; and
the adjacent first weldment and the second weldment welded and fixed.

Alternatively, the first weldment includes a first portion and a second portion, and the first portion and the second portion are arranged in relatively bending;
the first portion and the second weldment are arranged vertically or approximately vertically; and
the exhaust channel is provided between the second portion and the second weldment.

In the welding assembly and the battery module provided in the embodiment of the present application, at least one side of the welding seam is provided with an exhaust channel; and the exhaust channel is located between the first weldment and the second weldment. An exhaust gas generated during welding may be discharged from the exhaust channel to prevent it from entering the welding seam to reduce the strength of the welding seam.

In a third aspect, an apparatus is provided. The apparatus includes the above battery module, wherein the battery module is configured to provide power for the apparatus.

It should be understood that, the foregoing general description and the coming detailed description are merely exemplary and cannot limit the present application.

BRIEF DESCRIPTION OF THE DRAWINGS

In order to illustrate the technical solution in the embodiments of the present application more clearly, brief description will be made below to the drawings required in the embodiments, and apparently, the drawings described below are some embodiments of the present application only, and other drawings could be obtained based on these drawings by those ordinary skilled in this art without creative efforts.

DESCRIPTION OF REFERENCE SIGNS

1—a first weldment;
  10—a first portion;
  12—a second portion;
    120—a convex portion;
    122—a concave portion;
  14—a base layer;
  16—a coating layer;
2—a second weldment;
  24—a base layer;
  26—a coating layer;
3—an exhaust channel;
4—a welding position;
5—a battery cell group.

DESCRIPTION OF EMBODIMENTS

In order to better understand technical solutions in the present application, a detailed description of the technical solutions about the embodiments of the present application will be given below, in combination with the accompanying drawings.

It should be clear that the described embodiments are merely some but not all of the embodiments of the present application. All the other embodiments obtained by those of ordinary skill in the art based on the embodiments of the present application without any inventive effort shall fall within the scope of protection of the present application.

Terms used in embodiments of the present application are merely for the purpose of describing particular embodiments, and are not intended to limit the present application. The use of a singular form of "a", "the" and "said" in the embodiment of the present application and the claims appended hereto are also intended to include a plural form, unless otherwise clearly indicated herein by context.

It should be understood that the term "and/or" herein is merely a description of the associated relationship of associated objects, which indicates that there may be three relationships. For example, A and/or B may indicate three situations: A exists alone, both A and B exist, and B exists alone. In addition, the character "/" in this text generally indicates that the associated objects before and after the character are in an "or" relationship.

It should be understood that, unless otherwise stated, "a plurality of" means two or more (including two), the terms "first", "second" and "third" are only intended for a purpose of description, and shall not be understood as indicating or implying relative importance and assembling sequence.

Unless explicitly specified and defined otherwise, terms "installation", "interconnection", and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the description of this specification, it should be understood that the terms "substantially", "approximately", "or so", "about", "roughly" and "generally" described in the claims and embodiments of the present application refer to within a reasonable process operation range or tolerance range, which may be generally agreed, rather than an exact value.

Figure 1:
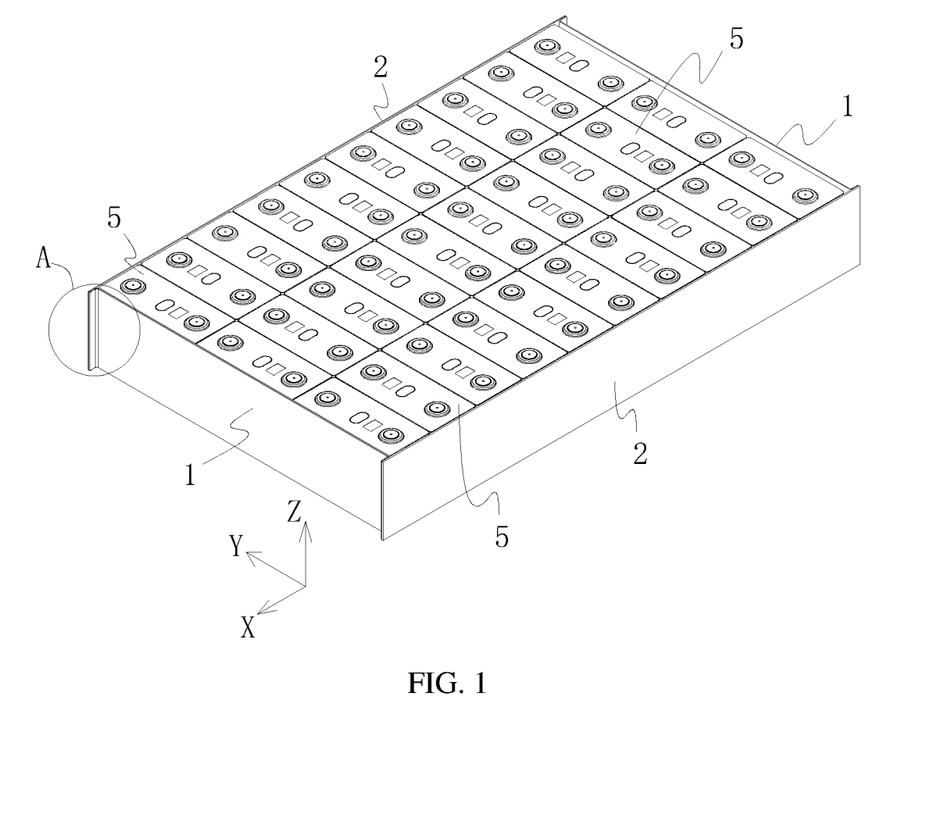
FIG. 1 is a schematic structural diagram of a battery module provided by an embodiment of the present application.

According to an embodiment of the present application, a battery module is provided. Please refer to FIGS. 1 to 3, where the battery module includes a battery cell group 5 and a welding assembly. The battery module has an X-direction, a Y-direction and a Z-direction. The battery cell group 5 includes a plurality of battery cells stacked together. A height of the battery cell is set to extend along the Z direction. A plurality of battery cells are stacked in the X direction. The battery module may include one or more battery cell groups 5. For example, as shown in FIG. 1, the battery module may include three battery cell groups 5 arranged side by side in the Y direction.

Figure 2:
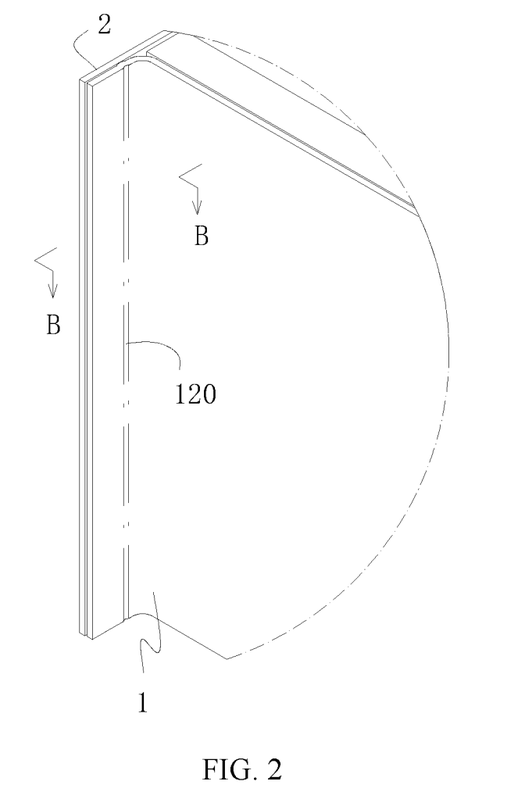
FIG. 2 is an enlarged schematic diagram at A in FIG. 1.
Figure 3:
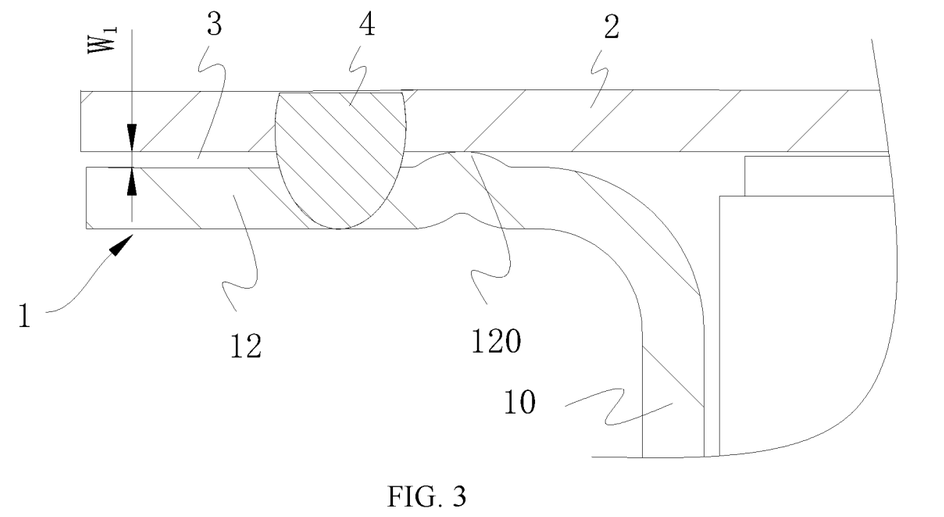
FIG. 3 is a sectional view taken along a direction of B-B in FIG. 2.

The welding assembly includes a first weldment 1 and a second weldment 2. The second weldment 2 is welded and fixed to the first weldment 1 and forms a welding seam 4. At least one side of the welding seam 4 is provided with an exhaust channel 3. The exhaust channel 3 is located between the first weldment 1 and the second weldment 2.

Two first weldments 1 are located at both ends of the battery cell group 5 along the X direction, respectively. Two second weldments 2 are located at both sides of the battery cell group 5 along the Y direction, respectively. The adjacent first weldment 1 and second weldment 2 are welded and fixed.

During welding, the first weldment 1 and/or the second weldment 2 is partially melted to achieve joining of the first weldment 1 and the second weldment 2. The welding seam 4 is formed at a joint position of the first weldment 1 and the second weldment 2.

The welding seam 4 conducts to the external environment through the exhaust channel 3. An exhaust gas generated during welding the first weldment 1 and the second weldment 2 may be discharged to the external environment through the exhaust channel 3, and will not enter the welding seam 4 to reduce the strength of the welding seam.

In order to more fully describe the exhaust structure and direction of the exhaust channel 3 in the embodiment of the present application, the battery module will be further described below.

There are many ways to shape the exhaust channel 3. The following describes the shaping structure of the exhaust channel 3 with an example.

In an alternative example, please refer to FIG. 2 to FIG. 9, where any one of the first weldment 1 and the second weldment 2 is provided with a convex portion 120. The convex portion 120 is arranged in contact with the other one of the first weldment 1 and the second weldment 2, so that the first weldment 1 and the second weldment 2 are arranged at an interval to form the exhaust channel 3.

In some embodiments, the first weldment 1 is provided with the convex portion 120. The convex portion 120 protrudes from a surface of the first weldment 1 and extends to a set height. The convex portion 120 is arranged in contact with the second weldment 2, so that the first weldment 1 and the second weldment 2 are arranged at an interval to form the exhaust channel 3.

In the example, please refer to FIG. 2 and FIG. 3, where the first weldment 1 may be provided with a convex portion 120. The convex portion 120 is disposed to extend along a width direction (the Z direction) of the first weldment 1 and extends to both ends of the first weldment 1 along the width direction (the Z direction).

When the convex portion 120 is arranged in contact with the second weldment 2, the first weldment 1 and the second weldment 2 may be naturally arranged at an interval to form the exhaust channel 3. The welding seam 4 may conduct the air on one side of the first weldment 1 along the X direction and the air on both sides along the Z direction through the exhaust channel 3. The exhaust gas generated during welding may be discharged to the air on one side of the first weldment 1 along the X direction and the air on both sides along the Z direction through the exhaust channel 3, and will not enter the welding seam 4 to reduce the strength of the welding seam.

Figure 4:
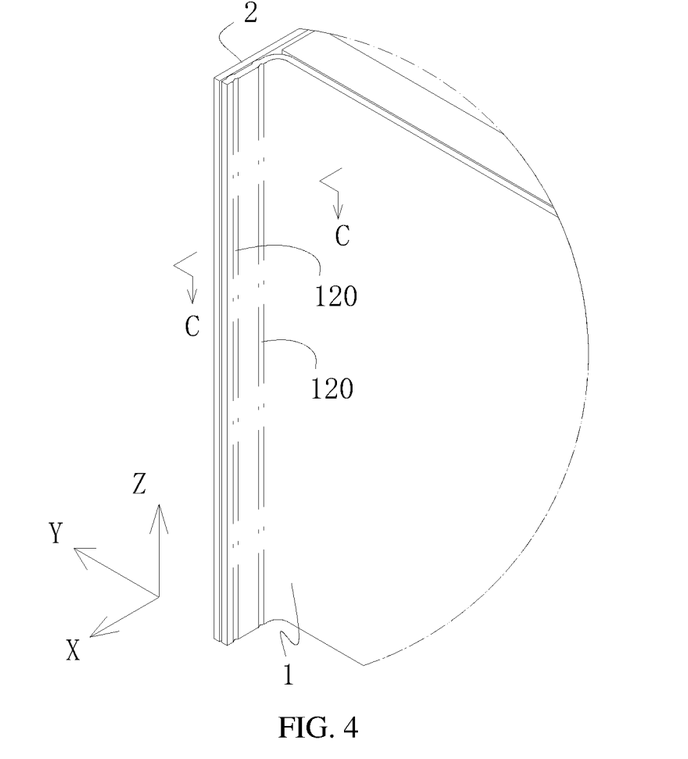
FIG. 4 is an enlarged schematic diagram at A in FIG. 1.
Figure 5:
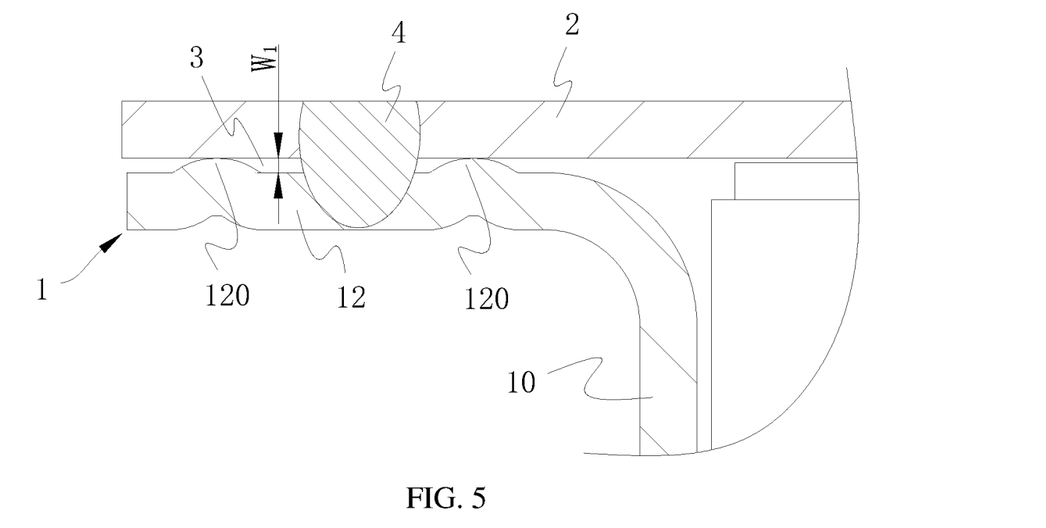
FIG. 5 is a sectional view taken along a direction of C-C in FIG. 4.

In the example, please refer to FIG. 4 and FIG. 5, where the first weldment 1 may be provided with at least two convex portions 120. Each convex portion 120 is disposed to extend along the width direction (the Z direction) of the first weldment 1 and extends to both ends of the first weldment 1 along the width direction (the Z direction). At least two convex portions 120 may be disposed at intervals in the X direction. For example, as shown in FIG. 4, the first weldment 1 is provided with two convex portions 120, and each convex portion 120 extends to both ends of the first weldment 1 along the width direction (the Z direction), and two convex portions 120 is disposed at intervals in the X direction.

When the convex portion 120 is arranged in contact with the second weldment 2, the first weldment 1 and the second weldment 2 are arranged at an interval to form the exhaust channel 3. The welding seam 4 may conduct the air on both sides of the first weldment 1 along the Z direction through the exhaust channel 3. The exhaust gas generated during welding may be discharged to the air on both sides along the Z direction to the first weldment 1 through the exhaust channel 3, and will not enter the welding seam 4 to reduce the strength of the welding seam.

The first weldment 1 is provided with at least two convex portions 120, which is easy to assemble, so that the first weldment 1 and the second weldment 2 are stably overlapped, and the convex portion 120 and the second weldment 2 are in stable contact, which improves the stability of welding the first weldment 1 and the second weldment 2.

Figure 6:
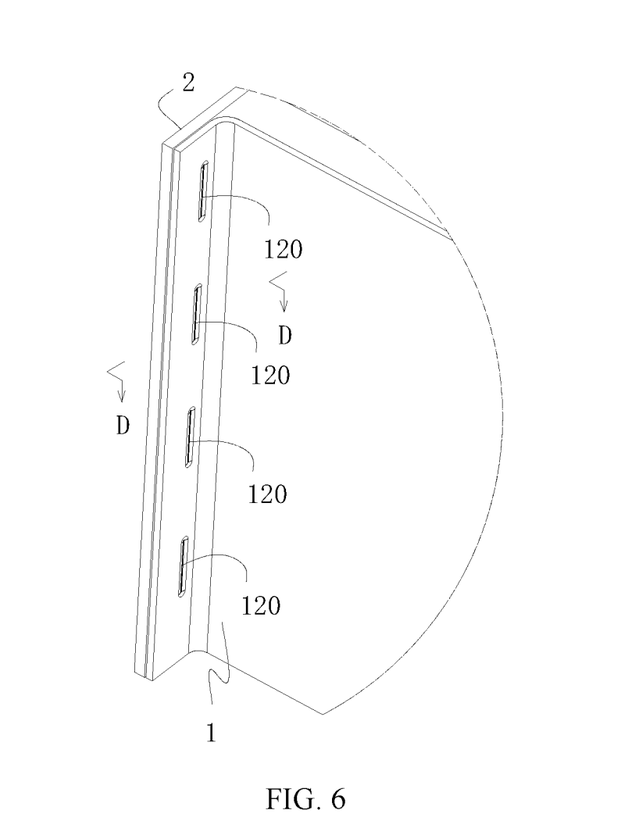
FIG. 6 is an enlarged schematic diagram at A in FIG. 1.
Figure 7:
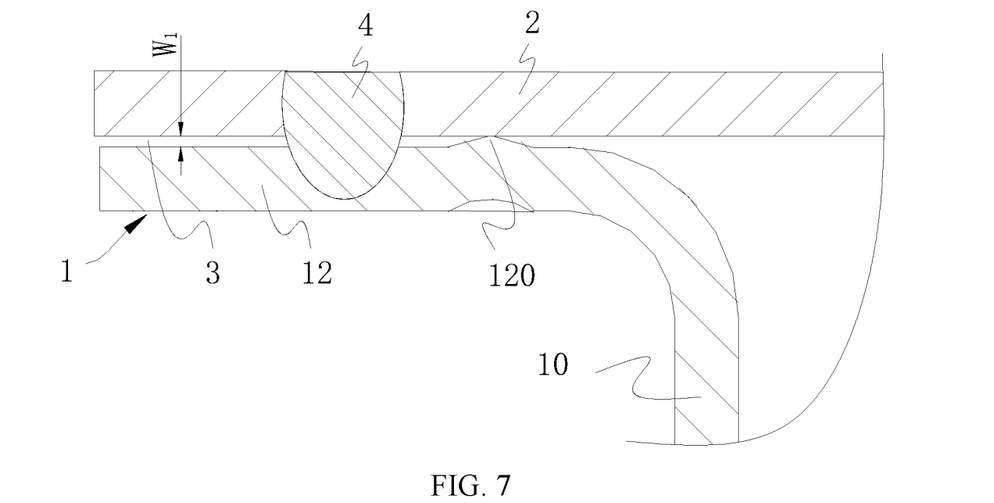
FIG. 7 is a sectional view taken along a direction of D-D in FIG. 6.

In the example, please refer to FIG. 6 and FIG. 7, where a plurality of convex portions 120 may be disposed at intervals along the width direction (the Z direction) of the first weldment 1 to form a row. For example, as shown in FIG. 6, four convex portions 120 are disposed at intervals along the width direction (the Z direction) of the first weldment 1 to form a row.

When the convex portion 120 is arranged in contact with the second weldment 2, the first weldment 1 and the second weldment 2 are naturally arranged at an interval to form the exhaust channel 3. The welding seam 4 may conduct the air on both sides of the first weldment 1 along the X direction and the air on both sides along the Z direction through the exhaust channel 3. The exhaust gas generated during welding may be discharged to the air on both sides of the first weldment 1 along the X direction and the air on both sides along the Z direction through the exhaust channel 3, and will not enter the welding seam 4 to reduce the strength of the welding seam.

Figure 8:
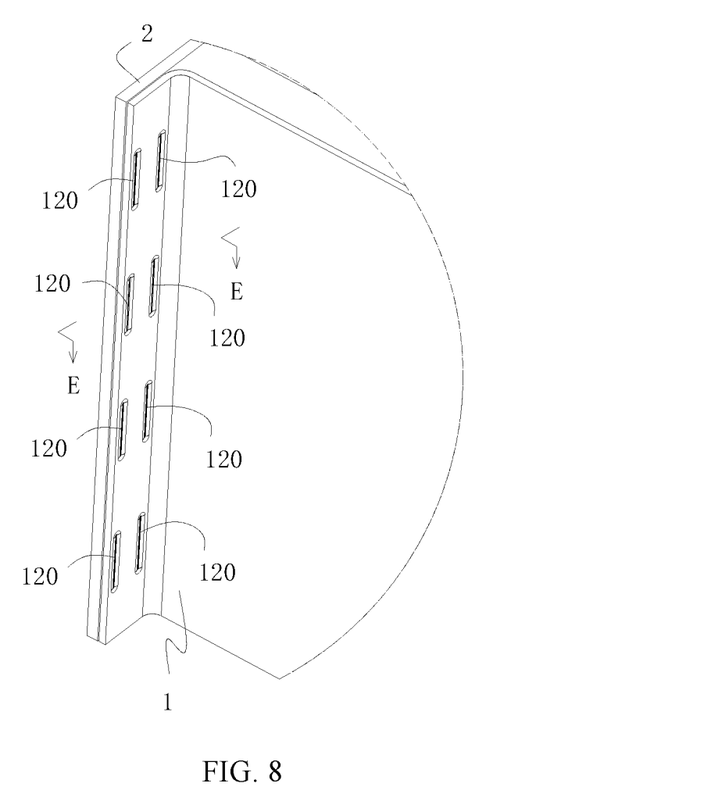
FIG. 8 is an enlarged schematic diagram at A in FIG. 1.
Figure 9:
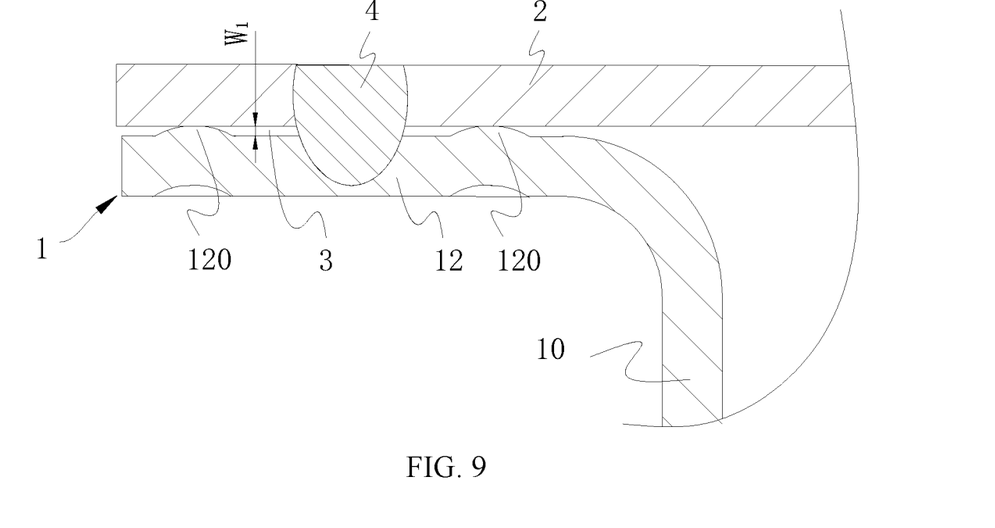
FIG. 9 is a sectional view taken along a direction of E-E in FIG. 8.

In the example, please refer to FIGS. 8 and 9, where a plurality of convex portions 120 are disposed at intervals along the width direction (the Z direction) of the first weldment 1 to form a row. The first weldment 1 is provided with a plurality of rows disposed in the X direction. For example, as shown in FIG. 8, the first weldment 1 is provided with eight convex portions 120, of which four convex portions 120 are disposed at intervals along the width direction (the Z direction) of the first weldment 1 to form a first row, the other four convex portions 120 are disposed at intervals along the width direction (the Z direction) of the first weldment 1 to form a second row, and the first row and the second row are disposed at intervals along the X direction.

When the convex portion 120 is arranged in contact with the second weldment 2, the first weldment 1 and the second weldment 2 are naturally arranged at an interval to form the exhaust channel 3. The welding seam 4 may conduct the air on both sides of the first weldment 1 along the X direction and the air on both sides along the Z direction through the exhaust channel 3. The exhaust gas generated during welding may be discharged to the air on both sides of the first weldment 1 along the X direction and the air on both sides along the Z direction through the exhaust channel 3, and will not enter the welding seam 4 to reduce the strength of the welding seam.

The convex portions 120 on the first weldment 1 are arranged in so many rows, which is easy to assemble, so that the first weldment 1 and the second weldment 2 are stably overlapped, and the convex portions 120 and the second weldment 2 are in stable contact, which improves the stability of welding the first weldment 1 and the second weldment 2.

In the example, please refer to FIG. 2, FIG. 4, FIG. 6 and FIG. 8, where the first weldment 1 or the second weldment 2 may be arranged in relatively bending, so as to achieve welding and fixing between the first weldment 1 and the second weldment 2. In some embodiments, the first weldment 1 includes a first portion 10 and a second portion 12, and the first portion 10 and the second portion 12 are arranged in relatively bending. The second weldment 2 may be configured as a flat plate structure. The first portion 10 and the second weldment 2 are arranged vertically or approximately vertically. The convex portion 120 is arranged on the second portion 12. The convex portion 120 is arranged in contact with the second weldment 2, so that the second portion 12 and the second weldment 2 are arranged at an interval to form the exhaust channel 3. During welding, the second weldment 2 is penetrated and welded from a side of the second weldment 2 away from the first weldment 1, so as to weld and fix the first weldment 1 and the second weldment 2.

The convex portion 120 is arranged on the first weldment 1, but not on the second weldment 2, which ensures the strength of the second weldment 2. When the battery cell group 5 expands and deforms along the X direction, the battery cell group 5 applies an expansion pressure along the X direction to two first weldments 1; when two first weldments 1 move away from each other along the X direction, a tensile force is generated on the second weldment 2; if the convex portion 120 is arranged on the second weldment 2, the strength of the second weldment 2 will be reduced; and at this time, if the expansion force generates the tensile force on the second weldment 2, the welding seam 4 may crack, causing the battery module to fall apart.

In the example, a protrusion height of the convex portion 120 may be set to be equal or unequal. Correspondingly, a width of the exhaust channel 3 may be set to be equal or unequal.

Figure 10:
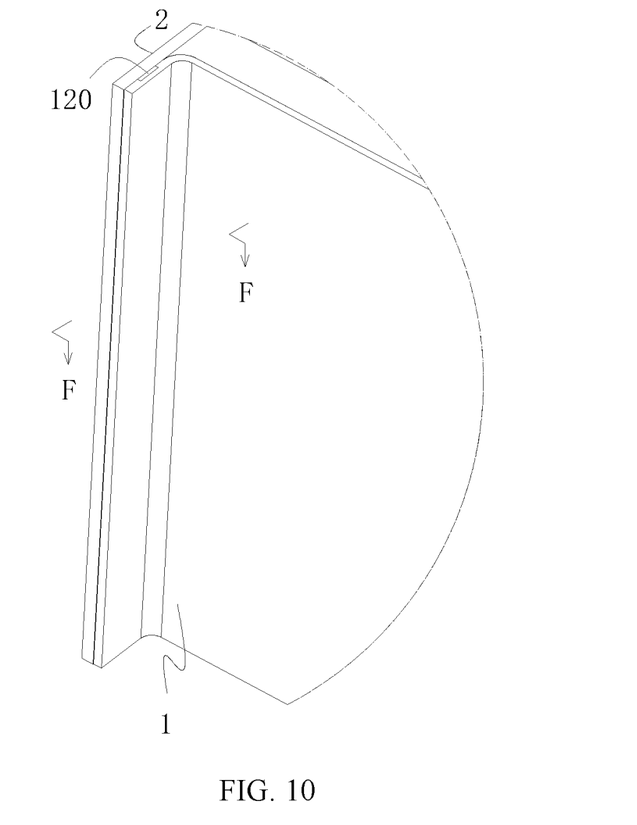
FIG. 10 is an enlarged schematic diagram at A in FIG. 1.
Figure 11:
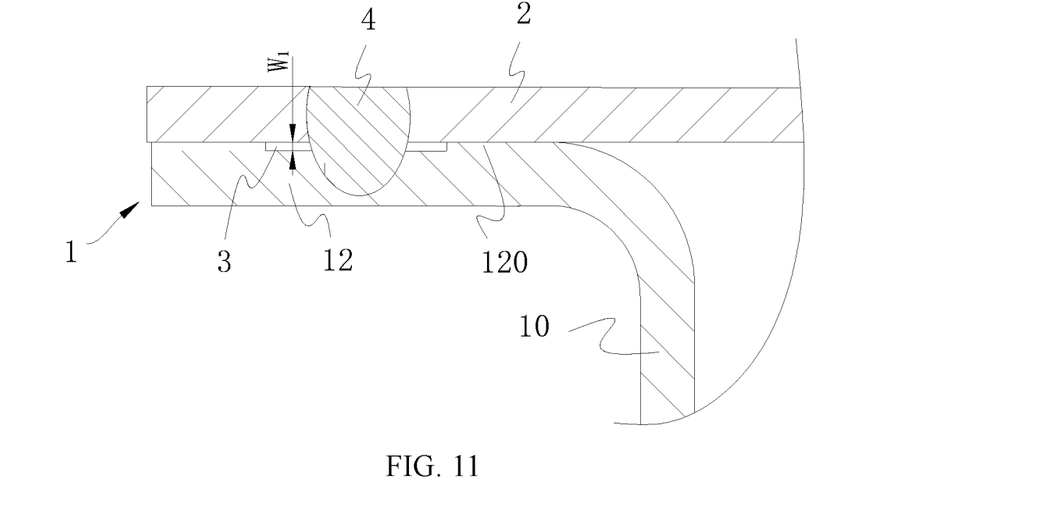
FIG. 11 is a sectional view taken along a direction of F-F in FIG. 10.

In another alternative example, please refer to FIGS. 10 and 11, where any one of the first weldment 1 and the second weldment 2 is provided with a concave portion 122. The concave portion 122 penetrates and extends to both ends of the first weldment 1 or the second weldment 2 along the width direction (the Z direction). The concave portion 122 and the other one of first weldment 1 and the second weldment 2 enclose to form the exhaust channel 3. The exhaust channel 3 correspondingly penetrate and extend to both ends of the first weldment 1 and the second weldment 2 along the width direction (the Z direction).

In some embodiments, the first weldment 1 is provided with the concave portion 122. The concave portion 122 penetrates and extends to both ends of the first weldment 1 along the width direction (the Z direction). The concave portion 122 and the second weldment 2 enclose to form the exhaust channel 3. The welding seam 4 may conduct the air on both sides of the first weldment 1 along the width direction (the Z direction) through the exhaust channel 3. The exhaust gas generated during welding may be discharged to the air on both sides of the first weldment 1 along the width direction (the Z direction) through the exhaust channel 3, and will not enter the welding seam 4 to reduce the strength of the welding seam.

The first weldment 1 and the second weldment 2 may be stably overlapped, which is easy to assemble, so that the concave portion 122 and the second weldment 2 enclose to form the exhaust channel 3, which improves the stability of welding the first weldment 1 and the second weldment 2.

In the example, the first weldment 1 may be provided with one or more concave portions 122.

In the example, the first weldment 1 or the second weldment 2 may be arranged in relatively bending, so as to achieve welding and fixing of the first weldment 1 and the second weldment 2. In some embodiments, please continue to refer to FIG. 1, and the first weldment 1 includes a first portion 10 and a second portion 12, and the first portion 10 and the second portion 12 are arranged in relatively bending. The second weldment 2 is configured as a flat plate structure. The first portion 10 and the second weldment 2 are arranged vertically or approximately vertically. The concave portion 122 is arranged on the first portion 10. The concave portion 122 and the second weldment 2 enclose to form the exhaust channel 3. During welding, the first weldment 1 and the second weldment 2 may be penetrated and welded from the side of the second weldment 2 away from the first weldment 1, so as to weld and fix the first weldment 1 and the second weldment 2.

The concave portion 122 is arranged on the first weldment 1, but not on the second weldment 2, which ensures the strength of the second weldment 2. When the battery cell group 5 expands and deforms along the X direction, both ends of the battery cell group 5 apply an expansion pressure to two first weldments 1 along the X direction, respectively. Two first weldments 1 move away from each other along the X direction. The concave portion 122 is arranged on the first weldment 1, which may ensure that the second weldment 2 is stretched and not damaged, thereby ensuring the connection stability of the entire battery module.

In the example, a recess depth of the concave portion 122 may be set to be equal or unequal. Correspondingly, a width of the exhaust channel 3 may be set to be equal or unequal.

Figure 12:
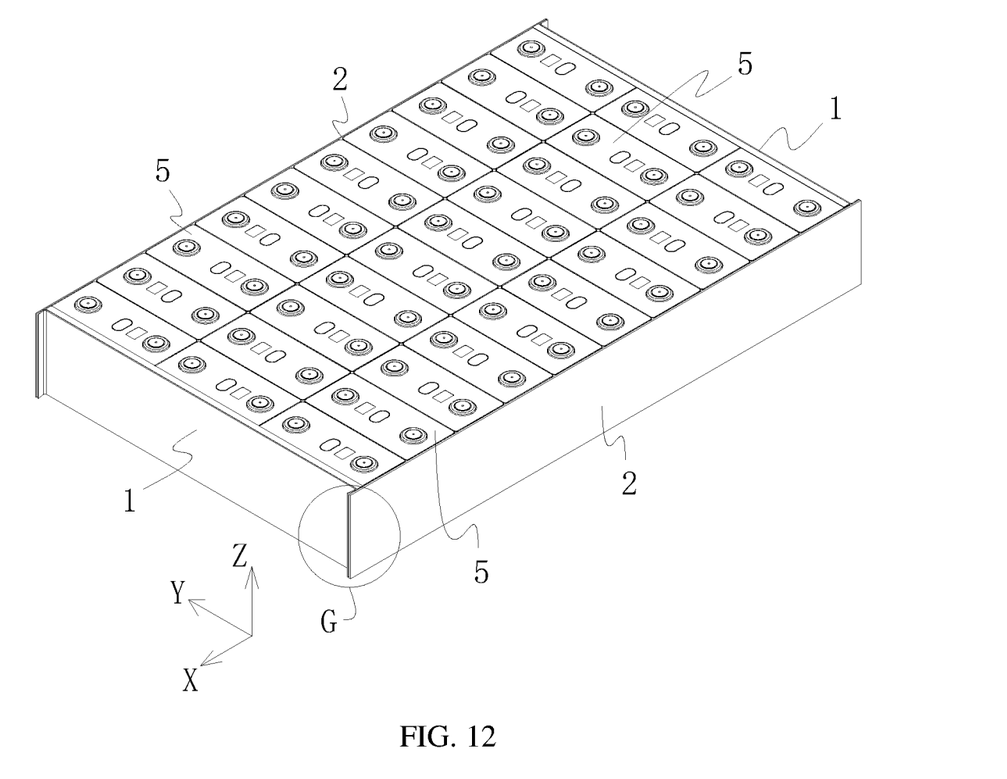
FIG. 12 is a schematic structural diagram of a battery module provided by an embodiment of the present application.
Figure 13:
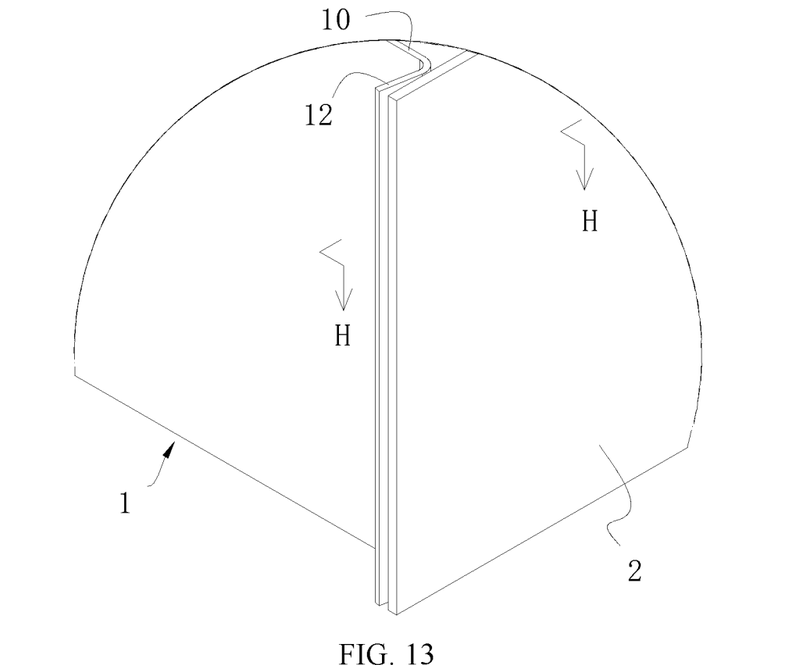
FIG. 13 is an enlarged schematic diagram at G in FIG. 12.
Figure 14:
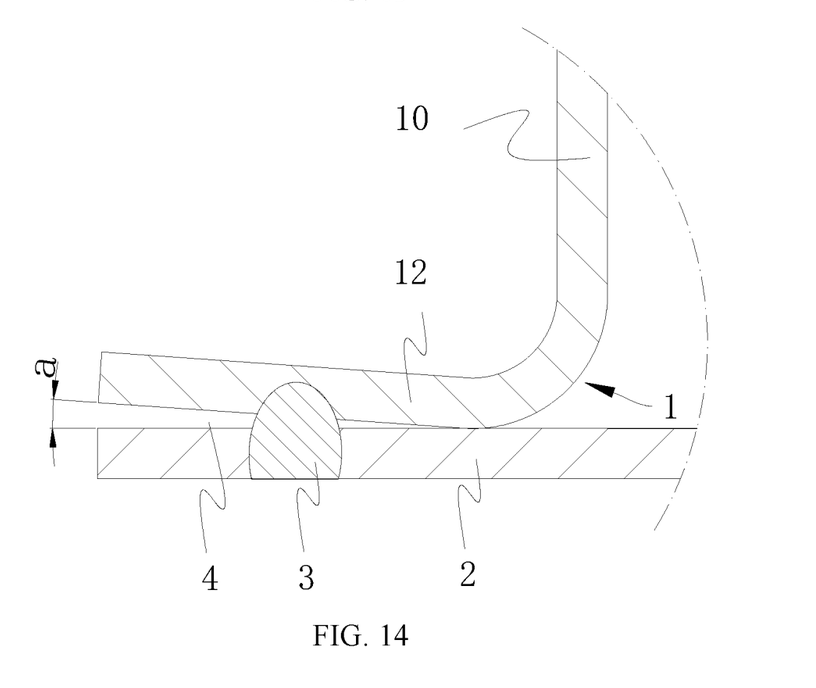
FIG. 14 is a sectional view taken along a direction of H-H in FIG. 13.

In another alternative example, please refer to FIG. 12 to FIG. 14, where the first weldment 1 includes a first portion 10 and a second portion 12, and the first portion 10 and the second portion 12 are arranged in relatively bending. The second weldment 2 may be configured as a flat plate structure. A corner of the first weldment 1 is arranged in contact with the second weldment 2. The first portion 10 and the second weldment 2 are arranged vertically or approximately vertically. An acute angle α is formed between the second portion 12 and the second weldment 2, so that the second portion 12 and the second weldment 2 are arranged at an interval to form the exhaust channel 3.

When the corner of the first weldment 1 is arranged in contact with the second weldment 2, the second portion 12 and the second weldment 2 are naturally arranged at an interval to form the exhaust channel 3. The welding seam 4 may conduct the air on one side of the second portion 12 along the X direction and the air on both sides along the Z direction through the exhaust channel 3. The exhaust gas generated during welding may be discharged to the air on one side of the second portion 12 along the X direction and the air on both sides along the Z direction through the exhaust channel 3, and will not enter the welding seam 4 to reduce the strength of the welding seam.

In the example, the acute angle α formed between the second portion 12 and the second weldment 2 may be equal to or less than 20°. For example, the acute angle α may be set to be 20°, 18°, 16°, 13°, 7° or other angles.

In some embodiments, the acute angle α may be equal to or less than 15°. For example, the acute angle a may be set to be 15°, 12°, 10°, 8°, 6°, 5°, 4° or other angles.

In the example, a spacing between the second portion 12 and the second weldment 2 at a position of the exhaust channel 3 is set to be unequal.

A maximum spacing between first weldment 1 and the second weldment 2 at the position of the exhaust channel 3 is the width of the exhaust channel 3. The exhaust channel 3 needs to be set to be a moderate width to be able to discharge the exhaust gas generated during welding. However, if the width of the exhaust channel 3 is too small, the exhaust gas cannot be discharged in time. If the width of the exhaust channel 3 is too large, the welding of the first weldment 1 and the second weldment 2 is not reliable.

In an alternative example, as shown in the figures, the maximum spacing between the first weldment 1 and the second weldment 2 at the position of the exhaust channel 3 may be set to be 0.05 mm-0.5 mm. For example, the maximum spacing $W_1$ can be set to be 0.05 mm, 0.08 mm, 0.2 mm, 0.3 mm, 0.4 mm or 0.5 mm, etc.

Furthermore, the maximum spacing between the first weldment 1 and the second weldment 2 at the position of the exhaust channel 3 may set to be 0.1 mm-0.3 mm. For example, the maximum spacing $W_1$ can be set to be 0.1 mm, 0.15 mm, 0.25 mm or 0.3 mm, etc.

Such arrangement may ensure that the exhaust gas generated during welding is discharged in time, and meanwhile may ensure the reliability of welding the first weldment 1 and the second weldment 2.

As long as the first weldment 1 and the second weldment 2 may be welded and fixed, a welding method of the first weldment 1 and the second weldment 2 may be selected and configured as required, and the present application does not limit it exclusively. For example, the first weldment 1 and the second weldment 2 may be welded and fixed by laser welding or by other welding methods.

In order to realize reliable and stable welding of the first weldment 1 and the second weldment 2, alternatively, the first weldment 1 and the second weldment 2 may be clamped during welding, so as to achieve overlap of the first weldment 1 and the second weldment 2. For example, the first weldment 1 and the second weldment 2 may be clamped by a tool during welding. Through clamping, a dimensional accuracy of the exhaust channel 3 may be effectively ensured, and stability and reliability of welding may be effectively ensured.

As mentioned above, by the convex portion 120 arranged on the first weldment 1 or the second weldment 2, or the concave portion 122 arranged on the first weldment 1 or the second weldment 2, or the angel arranged between the first weldment 1 and the second weldment 2, the exhaust channel 3 may be naturally formed between the overlapped first weldment 1 and the second weldment 2. The structure is simple, which is easy to assemble, simplifying the assembly process and reducing the requirements for the tool.

In order to more fully describe the material and structure of the first weldment and the second weldment in the embodiment of the present application, the welding assembly will be further described below.

However, when the first weldment and/or the second weldment are provided with a coating layer, if the coating layer vaporizes to form the exhaust gas when the first weldment and the second weldment are welded, the exhaust gas that enters the welding seam will further reduce the strength of the welding seam; and a large amount of high-temperature exhaust gas will accumulate in the welding seam, resulting in an excessively high air pressure, and hole blasting and spattering phenomenon will occur at the welding seam. The hole blasting phenomenon will cause the strength and fatigue performance of the welding seam to become weak, and cause the difference in the strength of the welding seam to be too large, which affects the reliability of welding. Particles produced by the spattering phenomenon will fall and thus causing safety hazards. The particles generated by the spattering phenomenon may damage welding equipment.

Figure 15:
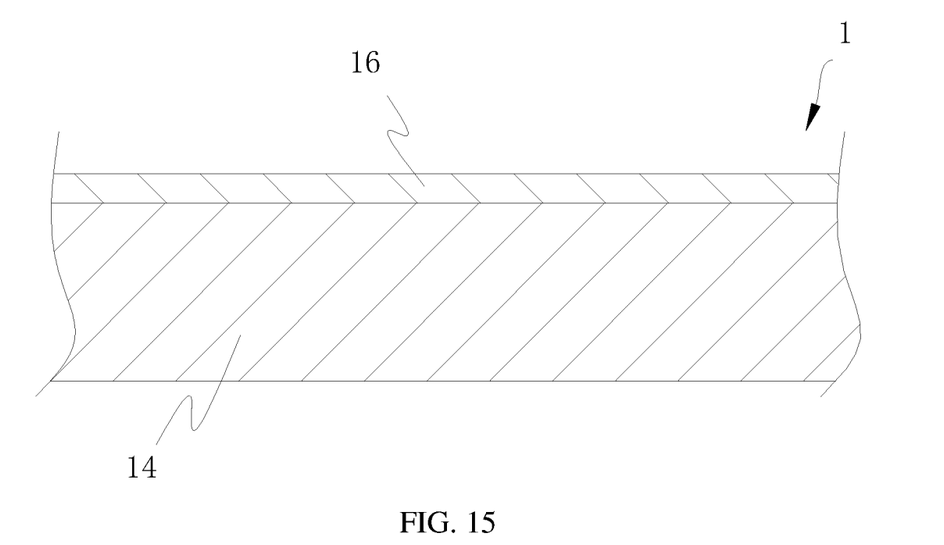
FIG. 15 is a schematic structural diagram of a first welding plate provided by an embodiment of the present application.
Figure 16:
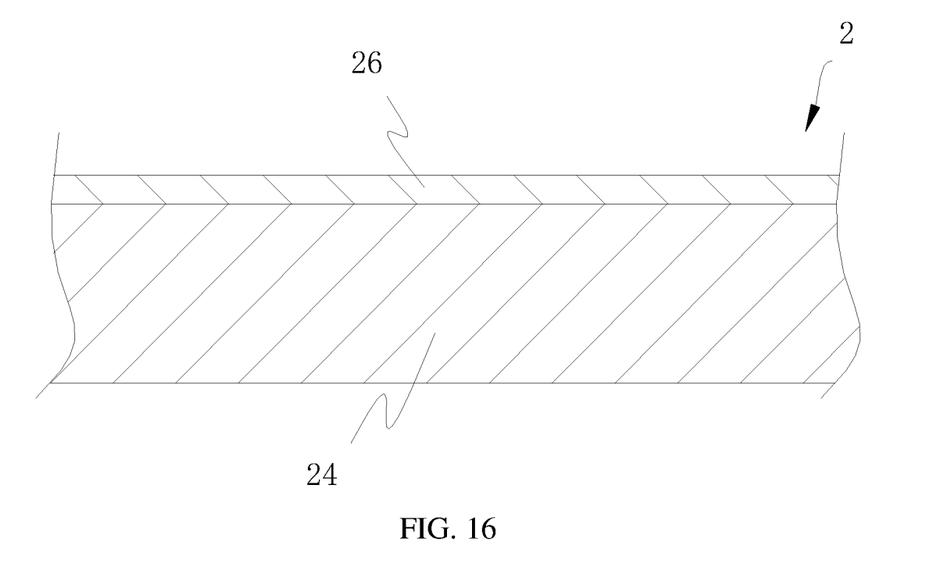
FIG. 16 is a schematic structural diagram of a second welding plate provided by an embodiment of the present application.

In one alternative example, please refer to FIG. 15 and FIG. 16, where the first weldment 1 and/or second weldment 2 includes a base layer 14, 24 and a coating layer 16, 26.

For example, the first weldment 1 includes a base layer 14 and a coating layer 16. The coating layer 16 is arranged on a surface of the base layer 14 to protect the base layer 14. A boiling point of the coating layer 16 is lower than a melting point of base layer 14.

For another example, the second weldment 2 includes a base layer 24 and a coating layer 26. The coating layer 26 is arranged on a surface of the base layer 24 to protect the base layer 24. A boiling point of the coating layer 26 is lower than a melting point of base layer 24.

For another example, the first weldment 1 includes a base layer 14 and a coating layer 16, and the second weldment 2 includes a base layer 24 and a coating layer 26. The coating layer 16 is arranged on a surface of the base layer 14, and a boiling point of the coating layer 16 is lower than a melting point of base layer 14. The coating layer 26 is arranged on a surface of the base layer 24, and a boiling point of the coating layer 26 is lower than a melting point of base layer 24. It may be understood that the base layer 14 and the base layer 24 may be configured to be the same or different, and the coating layer 16 and the coating layer 26 may be configured to be the same or different.

During welding, the base layers 14, 24 need to be heated and melted to a liquid state to achieve joining. Since the boiling point of the coating layers 16, 26 is lower than the melting point of the base layers 14, 24, the coating layers 16, 26 will vaporize to form the exhaust gas under an action of the high temperature during welding. The exhaust gas may be discharged from the exhaust channel 3, and the exhaust gas will not enter the welding seam to reduce the strength of the welding seam. The exhaust gas will not accumulate in the welding seam 4, so as to prevent hole blasting and spattering phenomenon.

In the example, a material of the coating layers 16, 26 may include one or more of zinc and magnesium. A boiling point of the coating layers 16, 26 is lower than a melting point of the base layers 14, 24.

The base layers 14, 24 may be configured to be a metal base layer. A melting point of the metal base layer is greater than a boiling point of the coating layer 16, 26. For example, the metal base layer may include one or more of steel and iron.

In the example, the first weldment 1 and/or second weldment 2 may be configured as a galvanized plate. The galvanized plate is a steel plate coated with a protective layer of zinc on a surface, which may achieve an anti-corrosion function. For example, the first weldment 1 is the galvanized plate. For another example, the second weldment 2 is a galvanized plate. For another example, the first weldment 1 and the second weldment 2 are both configured as the galvanized plate.

When the galvanized plate is welded, a temperature at the welding seam is greater than 1500° C., and a boiling point of the zinc coating layer on the surface of the galvanized plate is only 907° C. The temperature at the welding seam is greater than the boiling point of the zinc protective layer. During welding, the zinc coating layer will vaporize to form a rapidly volatile zinc vapor.

The zinc vapor and other exhaust gases may be discharged from the exhaust channel 3, and the zinc vapor and other exhaust gases will not be dissolved into the welding seam 4 to reduce the strength of the welding seam. The zinc vapor and other exhaust gases will not accumulate in the welding seam 4, so as to prevent hole blasting and spattering phenomenon.

It should be noted that each example of the present application may be used in combination or alone according to needs.

The welding assembly in the present embodiment is not limited to being respectively arranged on both ends and both sides of the battery cell group 5 to frame the battery cell group 5, and may also be arranged in other positions of the battery module.

The welding assembly in the present embodiment is not limited to being used in battery modules.

According to the same inventive concept, and according to another embodiment of the present application, a welding assembly is also provided. As shown in FIG. 2 to FIG. 11 and FIG. 13 to FIG. 16, the welding assembly includes a first weldment 1 and a second weldment 2. The first weldment 1 and the second weldment 2 are welded and fixed and forms a welding seam 4. At least one side of the welding seam 4 is provided with an exhaust channel 3. The exhaust channel 3 is located between the first weldment 1 and the second weldment 2.

During welding, the first weldment 1 and/or the second weldment 2 is partially melted to achieve joining of the first weldment 1 and the second weldment 2. The welding seam 4 is formed at a joint position of the first weldment 1 and the second weldment 2.

The welding seam 4 conducts to the external environment through the exhaust channel 3. The exhaust gas generated during welding the first weldment 1 and the second weldment 2 may be discharged to the external environment through the exhaust channel 3, and will not enter the welding seam 4 to reduce the strength of the welding seam.

It should be noted that other structures of the welding assembly in the present embodiment may be configured in the same way as the welding assembly in the above embodiment, and will not be repeated here.

The embodiments of the present disclosure further provide an apparatus, which includes a battery module according to any of the embodiments as described above, wherein the battery module is configured to provide power for the apparatus. The apparatus may be an electric vehicle, a hybrid vehicle, an electric scooter, an electric cart or any other suitable devices which can include the battery module as their own power source.

The above description are only the preferred embodiments of the present application, and are not intended to limit the present application. Any modification, equivalent substitution, improvement etc., made within the spirit and principle of the present application shall fall within for protection in scope of the present application.

What is claimed is:

1. A battery module, wherein comprising:
   a battery cell group; and
   a welding assembly, comprising:
   a first weldment; and
   a second weldment welded and fixed to the first weldment, and forming a welding seam;
   wherein, at least one side of the welding seam is provided with an exhaust channel; and
   the exhaust channel is located between the first weldment and the second weldment;
   two first weldments located at two ends of the battery cell group along an X direction, respectively; two second weldments located at both sides of the battery cell group along a Y direction, respectively; and the adjacent first weldment and the second weldment welded and fixed; and
   wherein the first weldment comprises a first portion and a second portion, and the first portion and the second portion are arranged in relatively bending; the first portion and the second weldment are arranged vertically or approximately vertically; and the exhaust channel is provided between the second portion and the second weldment.

2. The battery module according to claim 1, wherein:
   the first weldment and/or the second weldment comprises a base layer and a coating layer;
   the coating layer is arranged on a surface of the base layer; and
   a boiling point of the coating layer is lower than a melting point of the base layer.

3. The assembly battery module according to claim 2, wherein:
   a material of the base layer comprises one or more of iron and steel; and
   a material of the coating layer comprises one or more of zinc and magnesium.

4. The battery module according to claim 2, wherein:
   the first weldment and/or the second weldment is a galvanized plate.

5. The battery module according to claim 1, wherein:
   a maximum spacing between the first weldment and the second weldment at a position of the exhaust channel is 0.05 mm-0.5 mm.

6. The battery module according to claim 1, wherein:
   a maximum spacing between the first weldment and the second weldment at the position of the exhaust channel is 0.1 mm-0.3 mm.

7. The battery module according to claim 1, wherein:
   one of the first weldment and the second weldment is provided with a convex portion; and
   the convex portion is configured to be in contact with the other one of the first weldment and the second weldment, so that the first weldment and the second weldment are arranged at an interval to form the exhaust channel.

8. The battery module according to claim 7, wherein:
   the first weldment is provided with the convex portion; and
   the convex portion is configured to be in contact with the second weldment, so that the first weldment and the second weldment are arranged at an interval to form the exhaust channel.

9. The battery module according to claim 7, wherein:
   the convex portion is configured to extend to both ends of the first weldment or the second weldment along a width direction.

10. The battery module according to claim 7, wherein:
    one of the first weldment and the second weldment is provided with a plurality of convex portions, the plurality of convex portions are disposed at intervals along a width direction of the first weldment or the second weldment.

11. The battery module according to claim 1, wherein:
one of the first weldment and the second weldment is provided with a concave portion;
the concave portion is configured to penetrate and extend to both ends of the first weldment or the second weldment along a width direction; and
the concave portion and the other one of the first weldment and the second weldment are configured to enclose to form the exhaust channel.

12. The battery module according to claim 11, wherein:
the first weldment is provided with the concave portion;
the concave portion is configured to penetrate and extend to both ends of the first weldment along the width direction; and
the concave portion and the second weldment are configured to enclose to form the exhaust channel.

13. The battery module according to claim 1, wherein:
the first weldment comprises a first portion and a second portion, and the first portion and the second portion are arranged in relatively bending;
a corner of the first weldment is arranged in contact with the second weldment; and
an acute angle is formed between the second portion and the second weldment to form the exhaust channel.

14. An apparatus, comprising the battery module according to claim 1, wherein the battery module is configured to provide power for the apparatus.

\* \* \* \* \*